June 3, 1952     A. R. SPELBRING     2,598,850
JIG SAW
Filed Dec. 22, 1949     2 SHEETS—SHEET 1
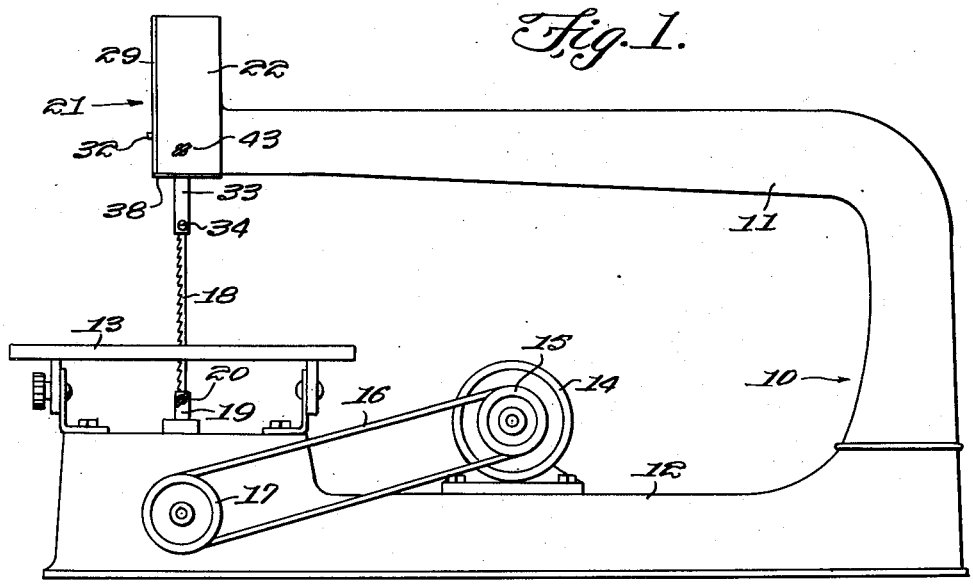
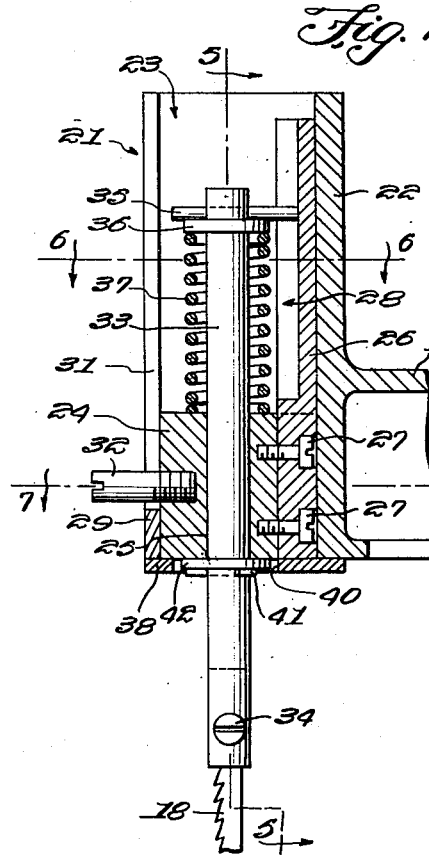
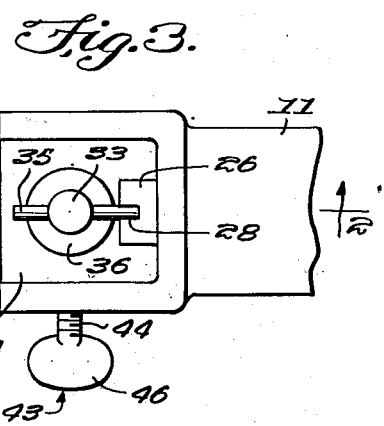
INVENTOR.
Arthur R. Spelbring,
BY Victor J. Evans & Co.
ATTORNEYS June 3, 1952  A. R. SPELBRING  2,598,850
JIG SAW
Filed Dec. 22, 1949  2 SHEETS—SHEET 2
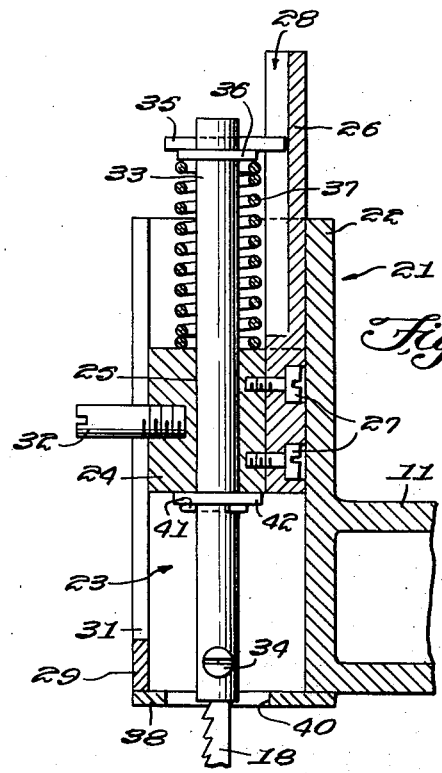
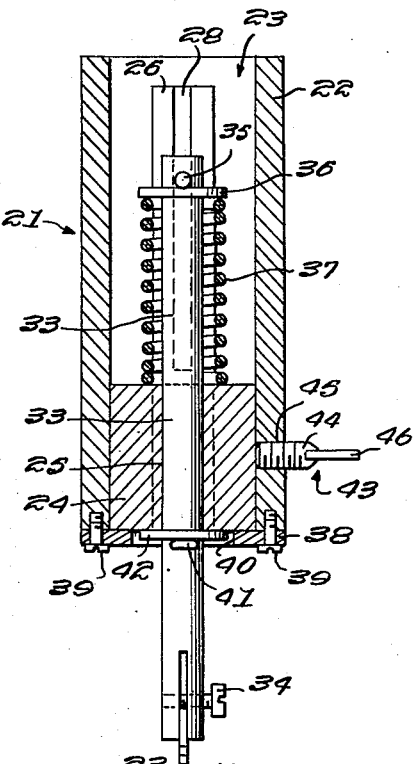
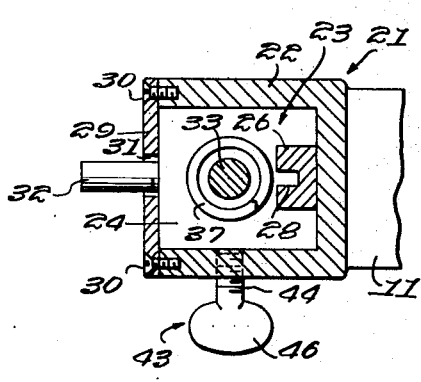
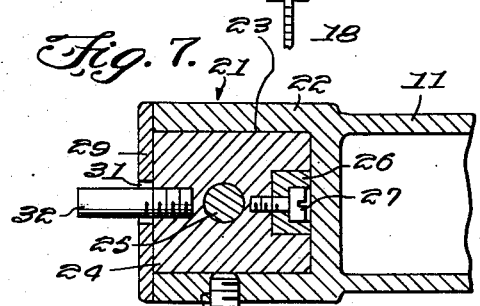
INVENTOR.
Arthur R. Spelbring,
BY Victor J. Evans & Co.
ATTORNEYS

Patented June 3, 1952

2,598,850

UNITED STATES PATENT OFFICE 2,598,850

JIG SAW

Arthur R. Spelbring, Rochester, Mich.

Application December 22, 1949, Serial No. 134,368

1 Claim. (Cl. 143—73)

This invention relates to a saw, and more particularly to a jig saw.

The object of the invention is to provide a jig saw which is constructed so as to facilitate the placement or movement of the saw blade from one part of the work piece to another.

Another object of the invention is to provide a jig saw which includes the usual saw blade, the saw blade being held in operative position by a novel retaining mechanism which permits the saw blade to be raised vertically so that the lower end of the saw blade can be inserted in a desired hole in the work piece, whereby the saw blade can be properly positioned without the necessity of having to completely remove the saw blade from the machine.

A further object of the invention is to provide a saw blade-retaining mechanism which is extremely simple and inexpensive to manufacture.

Other objects and advantages will be apparent during the course of the following description.

In the accompanying drawings forming a part of this application, and in which like numerals have been used to designate like parts throughout the same:

Figure 1 is a side elevational view of a jig saw constructed according to the present invention;

Figure 2 is a sectional view taken on the line 2—2 of Figure 3;

Figure 3 is a fragmentary top plan view of the saw blade-retaining mechanism;

Figure 4 is a view similar to Figure 2, but showing the carrier head in raised position, as when the saw blade is to be moved to a different hole in the work piece;

Figure 5 is a sectional view taken on the line 5—5 of Figure 2;

Figure 6 is a sectional view taken on the line 6—6 of Figure 2;

Figure 7 is a sectional view taken on the line 7—7 of Figure 2.

Referring in detail to the drawings, the numeral 10 designates a U-shaped frame which constitutes part of the jig saw or machine, the frame 10 including an upper, horizontally disposed arm 11 and a lower, horizontally disposed arm or base 12. A table 13 is supported by the free end of the arm 12, the table 13 serving to support a work piece thereon.

Mounted on the lower arm 12 intermediate its ends, and secured thereto, is the usual electric motor 14 which is adapted to drive a pulley 15. An endless belt 16 is trained over the pulley 15 and the belt 16 is also trained over a pulley 17. The motor 14 thus serves to impart a reciprocating or up-and-down movement to the jig saw blade 18. The lower end of the saw blade 18 is detachably connected to a bushing 19 by means of a set screw 20. The upper end of the saw blade 18 is connected to a retaining mechanism, designated generally by the numeral 21, and the retaining mechanism is constructed according to the novel arrangement of the present invention.

The retaining mechanism 21 is so constructed that the saw blade 18 can be shifted or raised vertically so as to permit the saw blade 18 to be inserted or positioned in any desired hole in a work piece without the necessity of having to disengage both ends of the saw blade 18 from its retaining members. The retaining mechanism 21 includes a body member 22 that is mounted on or formed integrally with the outer end of the upper arm 11, and the body member or slide 22 is provided with a vertically disposed, rectangular channel 23. Slidably arranged in the channel 23 is a carrier head 24 which also has a rectangular shape. The carrier head 24 is provided with a longitudinally extending bore 25 for a purpose to be later described.

Arranged contiguous to the rear surface of the carrier head 24 and secured thereto by screws 27 is a bracket 26, the bracket 26 being provided with an elongated groove 28.

Extending across the front of the body member 22 is a plate 29, the plate 29 being secured to the body member 22 by suitable screws 30. The plate 29 is provided with an elongated slot 31, and a stub shaft 32 projects through the slot 31 and is connected to the carrier head 24. The stub shaft 32 is adapted to be engaged by the user's fingers for selectively raising the carrier head 24 in the channel 23 when the saw blade 18 is to be positioned in a different hole in the work piece.

Slidably arranged in the bore 25 of the carrier head 24 is a cylindrical quill 33 which has its lower end detachably connected to the saw blade 18 by a screw 34. Extending transversely through the upper end of the quill 33 is a pin 35 which rides in the groove 28 in the bracket 26 so as to prevent rotation of the quill 33 in the bore 25. Mounted on the quill 33 adjacent the pin 35 is a washer 36. Circumposed on the quill 33 is a coil spring 37, the coil spring 37 being interposed between the washer 36 and the upper end of the carrier head 24. The coil spring 37 serves to normally urge the quill 33 to its uppermost position in the bore 25 of the head 24.

For limiting downward movement of the carrier head 24, a strip 38 is secured to the bottom of the body member 22 by suitable securing elements, such as bolts or screws 39. The strip 38 is cut away, as at 40, so as to permit reciprocatory or sliding movement of the quill 33 therethrough. A washer 42 is mounted on the quill 33 adjacent the bottom portion thereof, and the washer 42 is maintained in its proper position by means of a pin or key 41. The washer 42 serves to limit upward movement of the quill 33 in the bore 25.

For selectively maintaining the carrier head 24 immobile in the channel 23, a manually-operable thumb screw 43 is provided. The thumb screw 43 includes a threaded shank 44 that is arranged in threaded engagement with an aperture 45 in the body member 22, and a knob portion 46 is provided for manually rotating the thumb screw 43. Thus, when the carrier head 24 is to be raised or slid upwardly in the channel 23 by means of the stub shaft 32, the thumb screw 43 is first loosened or unscrewed, whereupon the carrier head 24 can be manually raised. After the carrier head 24 is returned to its lowered position, as shown in Figure 2 or 5, as for example, when the jig saw machine is to be used, the thumb screw 43 is then returned to the position shown in Figure 5, whereby the inner end of the thumb screw 43 will engage the carrier head 24 so as to prevent accidental sliding movement of the carrier head 24.

In use, a suitable work piece having a plurality of holes therein is supported on the table 13. Then, the saw blade 18 is inserted through the desired hole to be enlarged and the lower end of the saw blade is connected to the bushing 19 by the set screw 20, while the upper end of the saw blade 18 is connected to the quill 33 by the set screw 34. Then, upon actuation of the motor 14, the saw blade 18 will be reciprocated, whereby the work piece can be cut or sawed to the desired shape. After this hole has been enlarged, the saw blade 18 can be readily positioned in another hole to be enlarged in the work piece as the result of the arrangement or construction of the retaining mechanism of the present invention. Thus, to position the saw blade 18 in another hole in the work piece, the set screw 20 is first loosened so as to free the lower end of the blade 18 from the bushing 19. Then, the set screw 43 is loosened or unscrewed and then the carrier head 24 is raised in the channel 23 by means of the stub shaft 32. The carrier head 24 is raised until the lower end of the saw blade 18 clears the work piece. Then, the work piece is moved to its next location, and then the carrier head is returned or lowered in the channel 23 so that saw blade 18 passes through the next hole to be enlarged. Then, the set screw 43 is tightened so as to maintain the carrier head 24 immobile in its lowered position during operation of the machine, and also, the set screw 20 is tightened so as to connect the bottom or lower end of the saw blade 18 to the bushing 19. From the foregoing, it is apparent that a mechanism has been provided which will enable saw blades of jig saw machines to be moved from hole to hole without the necessity of releasing the saw blade 18 from the quill 33 and also from the bushing 19. In other words, it is only necessary to disconnect the saw blade 18 from the bushing 19 and then raise the saw blade 18 sufficiently so that the work piece is cleared. Previously, it was necessary to disconnect both ends of the saw blade 18 and then laboriously bend the saw blade 18 each time the saw blade was positioned in a new hole in a work piece.

The strip 38 serves to limit downward movement of the carrier head 24, while the groove 28 slidably receives therein the pin 35 so as to prevent rotation of the quill 33. Also, the coil spring 37 normally urges the quill 33 to its raised position. In other words, the usual actuating mechanism serves to lower the saw blade 18 upon actuation of the motor 14, and the coil spring 37 serves to repeatedly return the quill 33 and saw blade 18 to its raised position after each downward stroke of the saw blade 18. Also, the washer 42 serves to limit upward sliding movement of the quill 33 in the bore 25 of the carrier head 24.

Thus, it will be seen that a mechanism has been provided which will enable jig saw blades to be changed from one hole or position in a work piece to another hole or position with ease and rapidity. When changing the position of the jig saw blade, it is not necessary to disengage the upper end of the blade 18, since the mechanism of the present invention enables the saw blade to be raised vertically so as to clear the work piece. When it is desired to enlarge additional holes in a work piece, it is only necessary to loosen the screws 20 and 43. After the work piece has been moved to the desired location, these screws are again tightened.

By means of the mechanism of the present invention, inexperienced persons can readily change saw blades and also, experienced craftsmen will be able to speed up the amount of work turned out, since it is not necessary to release the blade at both ends when additional holes are to be enlarged or cut. The upper end of the saw blade 18 need never be detached except when the saw blade is to be replaced, as when the saw blade is worn out or broken.

I claim:

In a jig saw, the combination with a frame including a lower horizontally disposed arm and an upper horizontally disposed arm, a table secured to said lower arm for supporting thereon a work piece, a bushing slidable in said lower arm, and a reciprocatory saw blade having its lower end detachably connected to said bushing, of a retaining mechanism operatively connected to the upper end of said blade, said retaining mechanism comprising a body member mounted on the outer end of said upper arm, there being a vertically disposed channel arranged in said body member so that said channel opens through the lower end of the said body member, a plate secured to the front of said body member in overlying relationship to said vertically disposed channel and provided with a longitudinally extending slot that is aligned with and communicates with the said vertically disposed channel, a carrier head slidably arranged in said channel and provided with a longitudinally extending bore, a manually-engageable stub shaft connected to said head and projecting through said slot for raising said head, a horizontally disposed stop strip secured to the bottom of said body member in overlying relationship to the open end of said channel for limiting downward movement of said carrier head, a cylindrical quill slidably arranged in said bore and having its lower end detachably connected to the upper end of said saw blade, a bracket secured to the head and slidably arranged in said channel and provided with an elongated groove, and said head and said bracket are non-rotatable in the body member whereby rotation of the quill is prevented, a pin carried by said quill and projecting into said groove for preventing rotation of said quill, a thumb screw carried by said body member and mounted for movement into and out of engagement with said carrier head for selectively maintaining said carrier head immobile in said channel, a coil spring circumposed on said quill and interposed between said pin and carrier head for normally urging said quill upwardly in said bore.

ARTHUR R. SPELBRING.

REFERENCES CITED

The following references are of record in the file of this patent:

UNITED STATES PATENTS

| Number | Name | Date |
|---|---|---|
| 1,964,651 | Tautz | June 26, 1934 |
| 2,116,123 | Ocenasek | May 3, 1938 |